US007014007B2

(12) United States Patent  (10) Patent No.: US 7,014,007 B2
Iwamoto  (45) Date of Patent: Mar. 21, 2006

(54) BODY STRUCTURE OF FORKLIFT TRUCK

(75) Inventor: Yoshihide Iwamoto, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/879,227

(22) Filed: Jun. 30, 2004

(65) Prior Publication Data

US 2006/0011396 A1    Jan. 19, 2006

(51) Int. Cl.
   *B62D 21/10*   (2006.01)
(52) U.S. Cl. ............ 180/311; 296/203.02; 296/203.04; 280/781; 280/783; 280/785; 180/89.12
(58) Field of Classification Search ............... 180/68.1, 180/68.4, 311, 312, 313, 89.12, 309; 269/203.01, 269/204, 205, 203.02, 203.03, 203.04; 280/781, 280/783, 785
See application file for complete search history.

(56) References Cited

U.S. PATENT DOCUMENTS

| 3,540,540 A | * | 11/1970 | Schwab | 180/68.4 |
| 4,342,470 A | * | 8/1982 | Matsuda | 280/785 |
| 4,815,550 A | * | 3/1989 | Mather et al. | 180/68.1 |
| 4,854,278 A | * | 8/1989 | Honecker | 123/198 E |
| 5,114,207 A | * | 5/1992 | Nakajima et al. | 296/204 |
| 6,155,373 A | * | 12/2000 | Kajino | 180/299 |
| 6,293,364 B1 | * | 9/2001 | Anderson et al. | 180/312 |

FOREIGN PATENT DOCUMENTS

JP        2001-48497        2/2001

* cited by examiner

*Primary Examiner*—Christopher P. Ellis
*Assistant Examiner*—John Walters
(74) *Attorney, Agent, or Firm*—Wenderoth, Lind & Ponack, L.L.P.

(57) ABSTRACT

A body structure of a forklift truck is provided, with which no dead space is formed in a cross member while securing the constructional strength of the cross member, an increase in length of the truck body due to the space needed in the prior art to locate the exhaust muffler can be evaded resulting in a compact forklift truck, and winding-up of dust on the ground caused when the radiator cooling air flows to the underside of the truck body is prevented without an increase in manufacturing cost. The structure of the vehicle body having a cross member fixed to the inside faces of a pair of left and right side frames is characterized in that the cross member is composed of a vertical plate and a horizontal plate fixed to the vertical plate at a substantially right angle to form a crooked member having the general shape of an inversed letter "L" with an axle support member fixed the lower end of the vertical plate.

4 Claims, 6 Drawing Sheets

BODY STRUCTURE OF FORKLIFT TRUCK

BACKGROUND OF THE INVENTION

1. Field of the Invention

The present invention is related to a body structure of a forklift truck applied mainly to a forklift truck driven by an internal combustion engine, the body comprising a pair of left and right side frames extending in the longitudinal direction of the body and a cross member of which both lateral side ends are fixed to said side frames on the inside faces thereof and which is located above an rear axle of the forklift truck.

2. Description of the Related Art

A forklift truck is provided with a counter weight in the rear of the forklift truck to balance the weight of a load carried on the forklift provided in the front thereof, so force due to the weight of the counter weight and counter force from the rear axle due to traveling of the vehicle act on the rear part of the body frame. In a conventional forklift truck, two vertical cross member plates are fixed to a pair of side members to cope with such forces as shown in FIG. 6. In the drawing, reference numeral 106 is a body frame, 107 are a pair of left and right side frames extending in the longitudinal direction of the body frame, 020 is a cross member consisting of two vertical plates fixed to the inside faces 107a of the side frames 107, and 108 are erect members provided at the rear end of each of the side frames.

Said cross member 020 consists of two vertical plates 20 disposed parallel to each other with a certain distance and an axle supporting member 22 welded to the vertical plates 20 at the lower end thereof, a rear axle not shown in FIG. 6 being located under the axle supporting member 22. Both lateral side ends of each of the vertical plates 20 are welded to the inside faces 107a of the side frames 107.

In Japanese Laid-Open Patent Application No. 2001-48497 is disclosed a forklift truck which is composed such that a front frame having a pair of left and right outer rails and a rear frame having a pair of left and right inner rails are provided and the inner rails are received in the outer rails so that the inner rails can be slid relative to the outer rails without interfering with front and rear wheels in order to change the wheel base of the forklift truck.

In a forklift truck provided with a counter weight (not shown in FIG. 6) to balance the weight of a load carried on the fork provided in the front of the vehicle, force F2 in the longitudinal direction of the truck body resulted by the moment around the supporting point of the counter weight due to the offset of the center of gravity of the counter weight from the bearing point of the counter weight on the body frame acts on the cross member 020 in addition to force F1 in vertical direction acting on the axle support member 22 from the rear axle resulting due to the vertical shock which occurs when the forklift truck is traveling, as shown in FIG. 6. Therefore, each force F1 and F2 acts to bend the cross member 020 and the welded parts of the both lateral ends of the vertical plates 20 of the cross member 020 and left and right side members 107 are considerably stressed by the bending moment due to force F1 and F2.

In the prior art of construction as shown in FIG. 6, as the cross member 020 to which vertical force F1 and lateral force F2 are applied at the lateral center portion thereof is composed such that two vertical plates 20, to which an axle support member 22 is welded at the lower ends of the vertical plates, are disposed in parallel to each other and welded to the inside faces 107a of the side frames 107, the distance 21 between the plates must be determined to be somewhat large in order to secure the strength of structure.

However, with a structure like this, the space 21 between the vertical plates 20 becomes a dead space where parts can not be located, and it is difficult to construct a compact vehicle.

Generally, an engine exhaust muffler (not shown in the drawing) is located at the back of the rear side vertical plates 20 of the cross member 020 parallel to the plate, so the length of the forklift truck becomes inevitably long. Further, as the cross member 020 which is located under the radiator of the engine is provided as mentioned above, the cooling air of the radiator conducted to the exhaust opening formed in the counter weight is liable to flow toward the underside of the body resulting in an easy winding-up of dust on the ground. Therefore, it is needed to provide an additional member in order to prevent the flow of the cooling air toward the underside of the body, which causes a complication in structure and an increase in manufacturing cost.

SUMMARY OF THE INVENTION

The present invention was made in light of the problems of the prior art as mentioned above, and the object of the invention is to provide a body structure of a forklift truck with which no dead space is formed in a cross member while securing the constructional strength of the cross member, an increase in the length of the truck body due to the space needed in the prior art to locate the exhaust muffler can be evaded resulting in a compact forklift truck, and winding-up of dust on the ground caused when the radiator cooling air flows to the underside of the truck body is prevented without providing additional parts in particular which induces an increase in cost.

To achieve the object, the invention proposes a body structure of a forklift truck having a pair of left and right side frames extending in the longitudinal direction of the vehicle body, and a cross member fixed to the inside faces of the side frames at the lateral side ends of the cross member to connect the side frames, the cross member being located on an axle, wherein said cross member is composed of a vertical plate and a horizontal plate fixed to the vertical plate at a substantially right angle to form a crooked member having the general shape of an inversed letter "L" with an axle support member fixed to the lower end of the vertical plate.

It is preferable that said cross member is a welded construction of the crooked member and the axle support, the lateral side ends of the crooked member is welded to the inside faces of the side frames, and the axle support member is welded substantially horizontally to the lower end of the crooked member.

In a forklift truck, in addition to vertical force which is transmitted from the axle by way of the axle support and acts onto the cross member connecting said pair of left and right side members, horizontal force acts onto the cross member due to moment of the weight of the counter weight around the bearing point of the counter weight supported on the body frame. Therefore, complex bending stress occurs at the welded portion of the lateral end of the cross member to the inside face of the side member. Bending moment due to vertical force is borne mainly by the vertical plate 12 which has a large section modulus concerning a horizontal plane because the modulus is proportional to the second power of the height of the vertical plane and bending moment due to horizontal force is borne mainly by the horizontal plate 11 which has a large section modulus concerning a vertical plane in lateral direction because the modulus is proportional to the second power of the width of the horizontal plate in the longitudinal direction of the side members. Accordingly, the stress at said welded portion, which is inversely proportional to section modulus, is reduced compared with the case the cross member is composed of two vertical plate which has a large section modulus only concerning a horizontal plane and small section modulus concerning a vertical plane in lateral direction because it is the sum of the section modulus of each vertical plate concerning a vertical plane in lateral direction, which is proportional to the second power of the thickness of the plate, and the plate thickness is very small compared with the plate height. Therefore, according to the present invention, the stress due to the bending moments can be reduced.

Further, the present invention proposes a body structure of a forklift truck in which a counter weight having an opening for exhausting the cooling air flowing out from a radiator is located at the rear side of the radiator, the body of the forklift truck having a pair of left and right side frame extending in the longitudinal direction of the body with a counter weight attached at the rear of the body, a cross member being fixed to the inside faces of the side frames at the lateral side ends of the cross member to connect the side frames, the cross member being located on a rear axle, wherein said cross member is composed of a vertical plate and a horizontal plate fixed to the vertical plate at a substantially right angle to form a crooked member having the general shape of an inversed letter "L" with an axle support member fixed the lower end of the vertical plate, and an engine exhaust muffler is located in the space formed at the rear of the vertical plate under the horizontal plate.

According to the invention, the cross member to connect the left and right side frames is formed into a crooked member with a vertical plate and a horizontal plate fixed to the vertical plate at a substantially right angle so that the crooked member has the general shape of an inversed letter "L" with an axle support member fixed to the lower end of the vertical plate, and an engine exhaust muffler is located at the rear of the vertical plate under the horizontal plate, so that the length of the forklift truck is reduced compared with that of the prior art in which the exhaust muffler is located at the rear of the rear side vertical plate of the cross member of two vertical plates, resulting in a compact forklift truck.

It is preferable that the horizontal plate is located under said radiator to prevent air including the cooling air flowing out from the radiator toward the opening of the counter weight from flowing to the underside of the vehicle body.

With the construction like this, the horizontal plate of the cross member serves to prevent the cooling air flowing out from the radiator from flowing to the underside of the vehicle body, and winding-up of dust on the ground is evaded.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
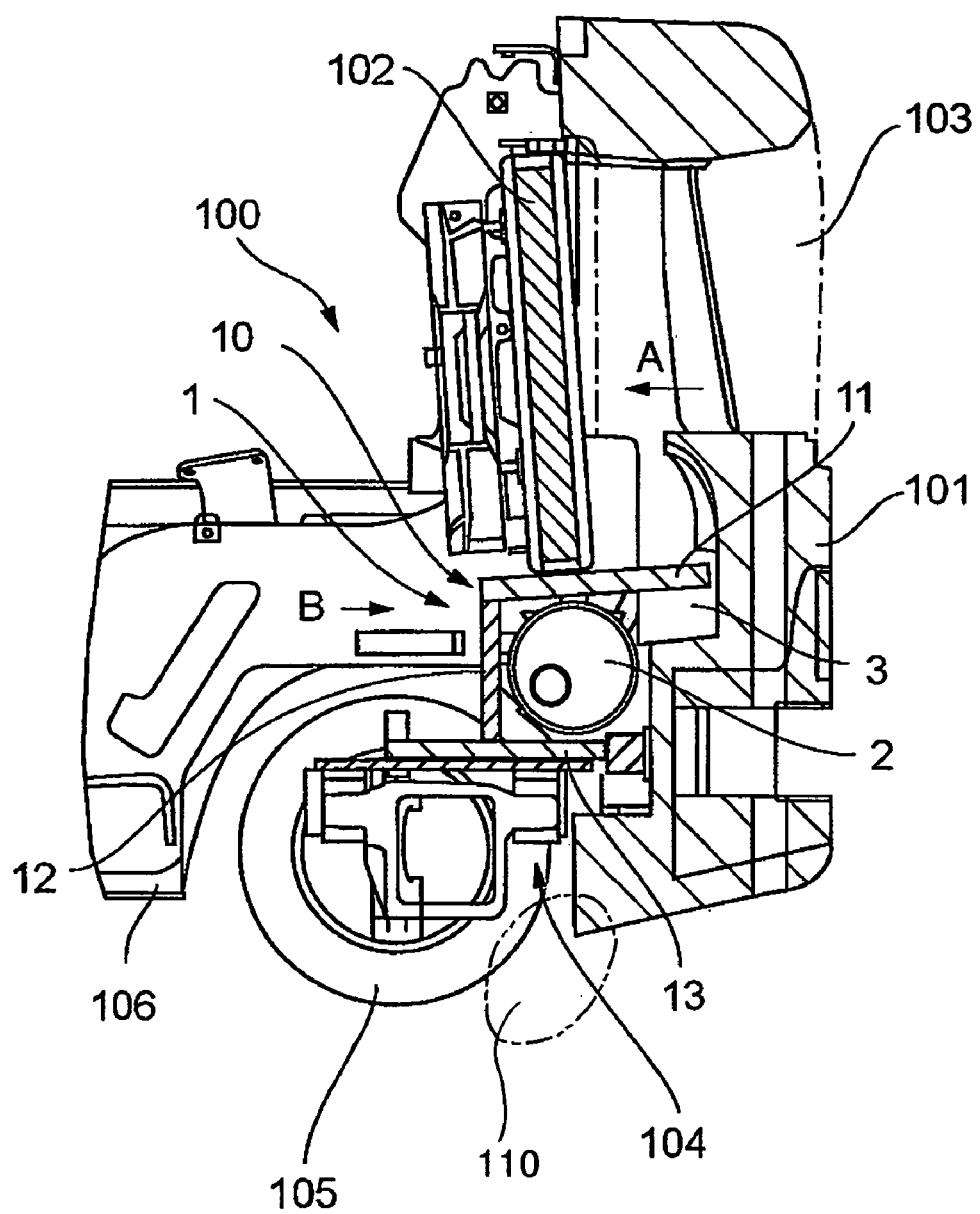
FIG. 1 is a side view including a partial sectional view of the construction of the rear part of an embodiment of the forklift truck according to the present invention.
Figure 2:
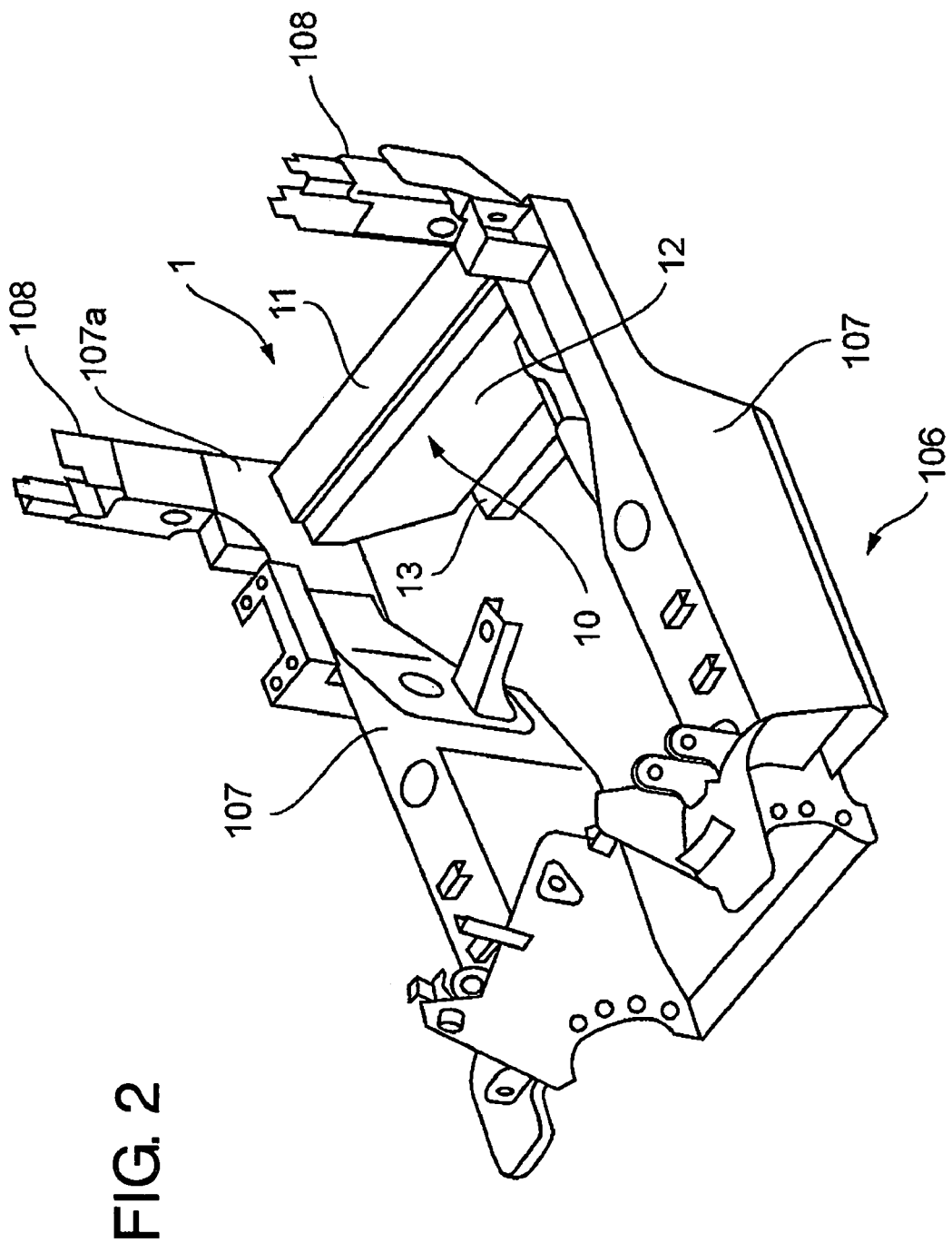
FIG. 2 is a diagonally front perspective view of the body frame of FIG. 1.
Figure 3:
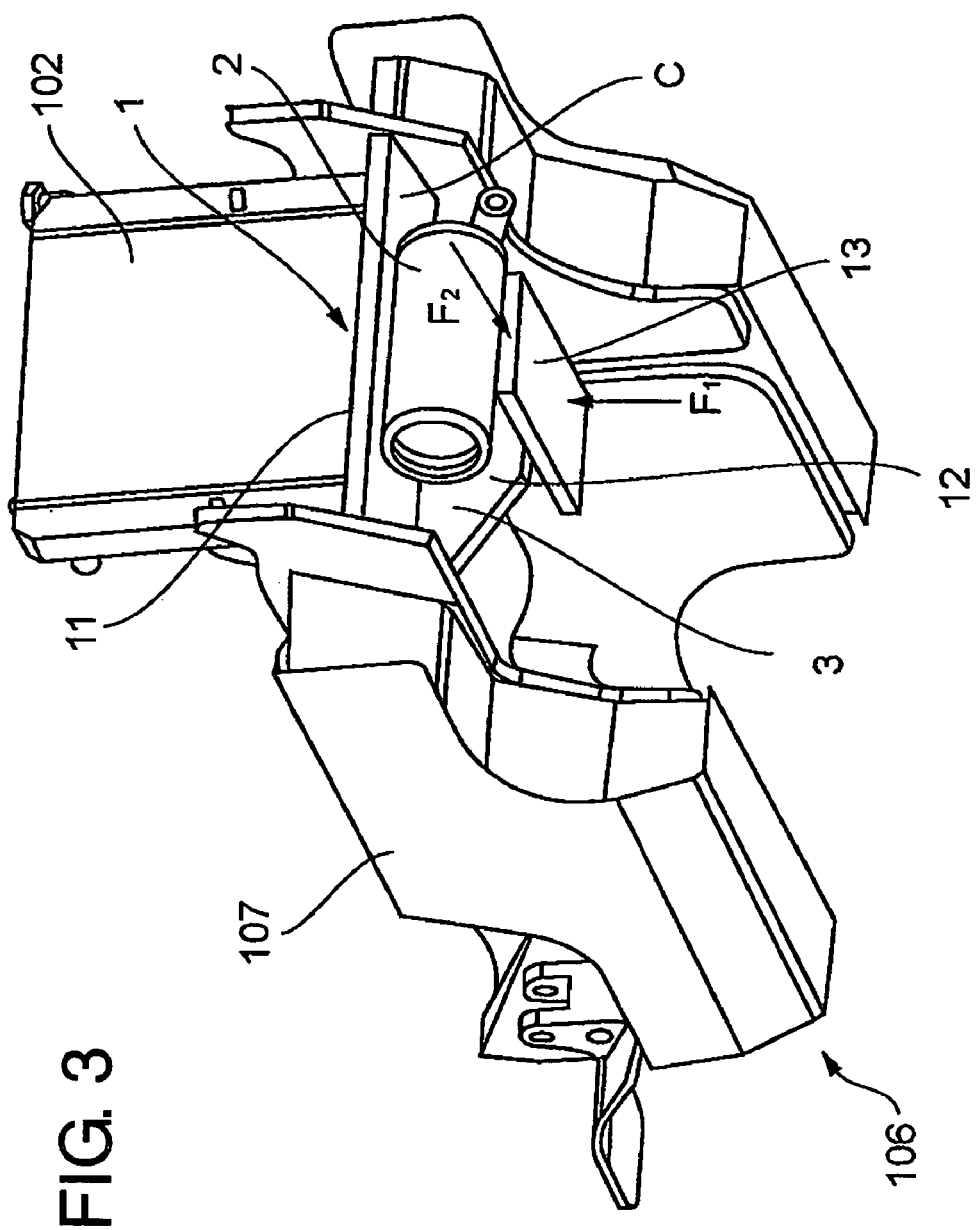
FIG. 3 is a diagonally rear perspective view of the body frame of FIG. 1 (viewed in the direction of arrow A in FIG. 1).
Figure 4:
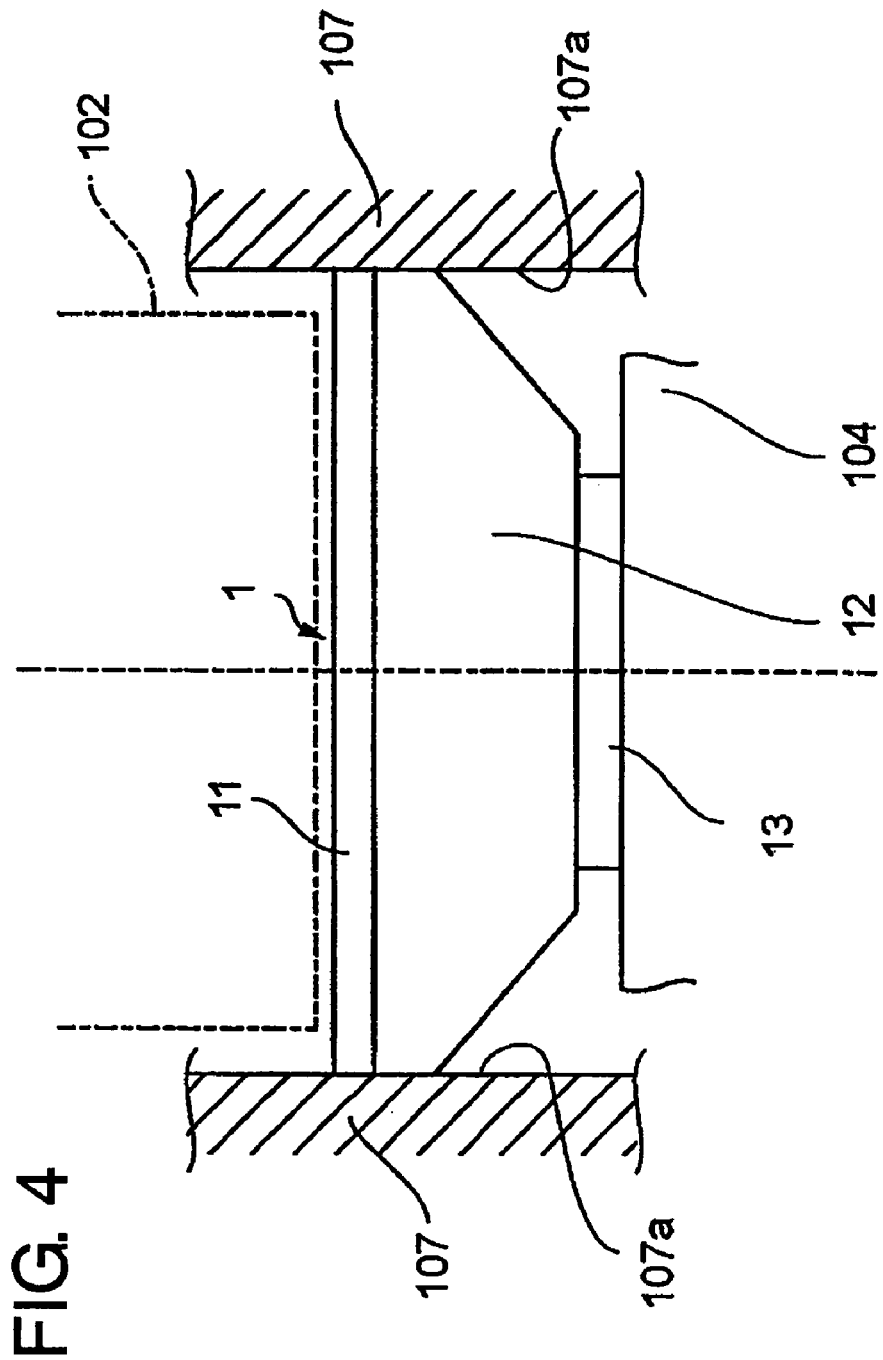
FIG. 4 is a view in the direction of arrow B in FIG. 1.
Figure 5:
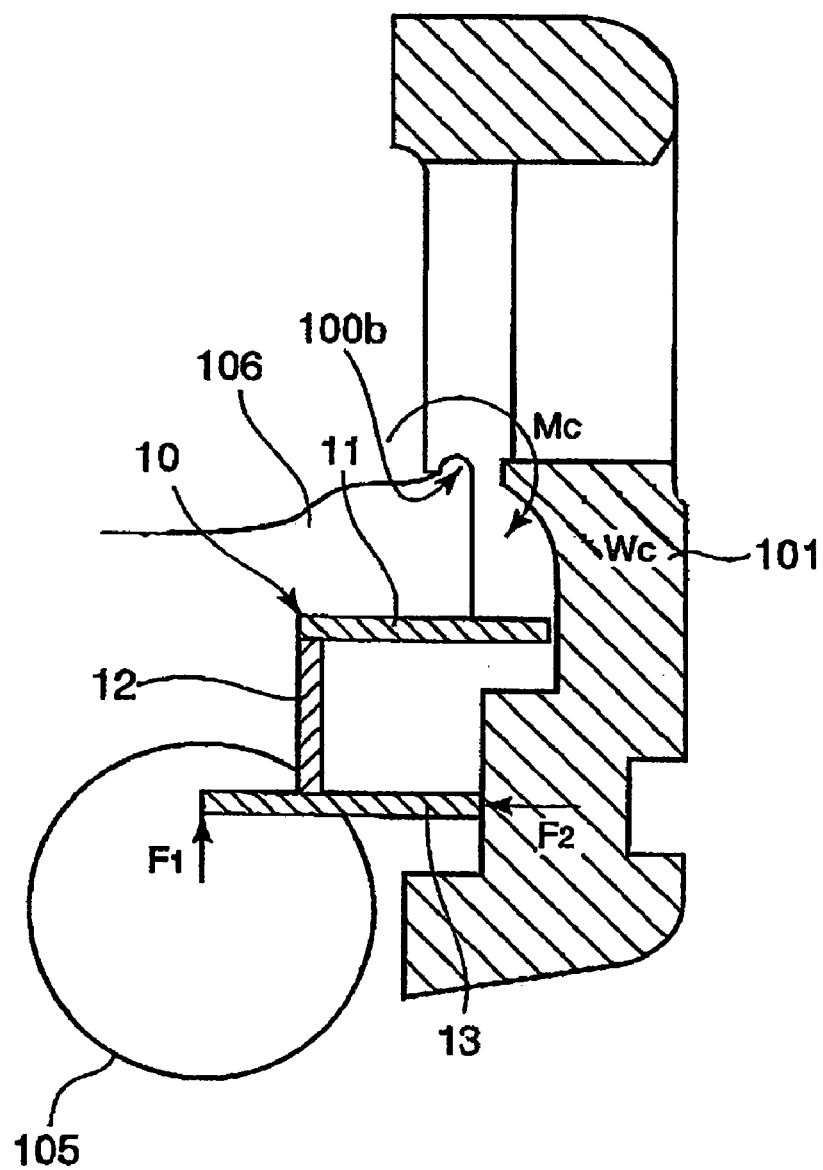
FIG. 5 is a longitudinal sectional view of the rear part for explaining the action of forces.
Figure 6:
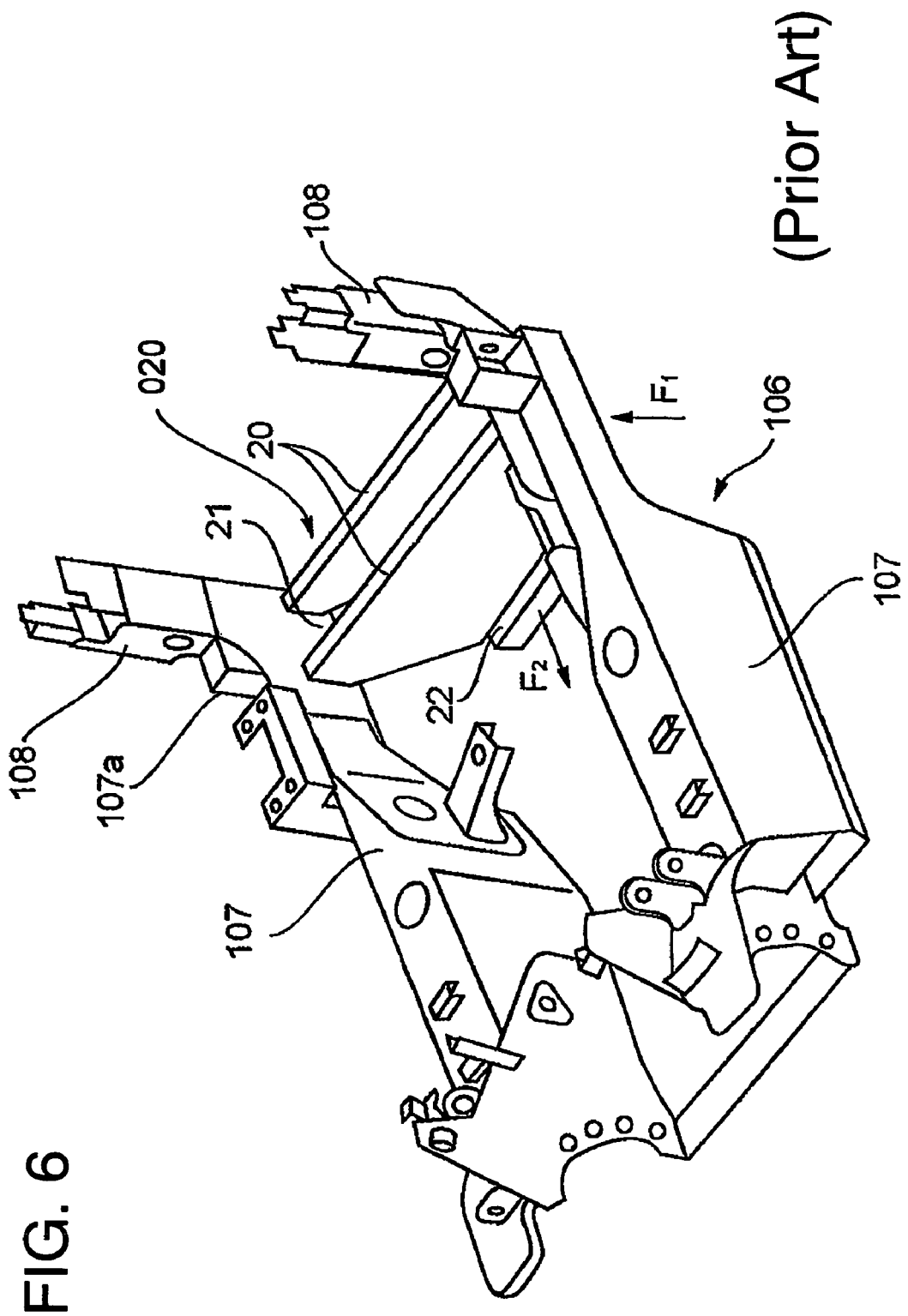
FIG. 6 is a diagonally front perspective view of the body frame of prior art.

FIG. 1 is a side view including a partial sectional view of the construction of the rear part of an embodiment of the forklift truck according to the present invention. FIG. 2 is a diagonally front perspective view of the body frame of FIG. 1, FIG. 3 is a diagonally rear perspective view of the body frame of FIG. 1 (viewed in the direction of arrow A in FIG. 1), and FIG. 4 is a view in the direction of arrow B in FIG. 1. FIG. 5 is a longitudinal sectional view of the rear part for explaining the action of forces.

Referring to FIGS. 1–4 representing the forklift truck 100 according to the present invention, reference numeral 106 is a body frame, which consists of a pair of left and right side frames 107 extending in the longitudinal direction of the truck body as shown in FIG. 2. Reference numeral 101 is a counter weight attached to the rear of the frame 106, 102 is a radiator for cooling the engine cooling water by air, 103 is an opening formed in the counter weight 101 in the rear of the radiator 102 for exhausting the radiator cooling air flowing out therefrom. Reference numeral 105 is a rear wheel (only a rear wheel of one side is represented), and 104 is a rear axle.

Referring to FIG. 2, reference numeral 1 is a cross member fixed to the inside faces 107a of said side frames 107 at both lateral ends of the cross member to connect the side frames. Said cross member 1 is a welded structure composed of a crooked member 10 of which the cross section has the general shape of an inversed letter "L" and a horizontal axle support plate member 13 welded to the lower end of the crooked member 10, the rear axle 104 (see FIG. 1) being attached to the axle support member 13.

Said crooked member 10 is composed of a horizontal plate 11 and a vertical plate 12 welded to said horizontal plate 11, the vertical plate 12 extending downward at about right angle to the horizontal plate 11.

Said cross member 1 is welded to the inside faces 107a of the side members 107 at both lateral side ends thereof as shown in FIG. 2 and FIG. 4.

Reference numeral 2 is an exhaust muffler and it is located in a muffler space 3 formed at the rear of the vertical plate 12, under the horizontal plate 11, as shown in FIG. 1 and FIG. 3.

The horizontal plate 11 of the cross member 1 extends rearward so that it partitions the radiator 102 side space above the horizontal plate 11 from said muffler space 3, preferably it extends so that the rear end thereof reaches near to the counter weight 101.

In FIG. 2, reference numeral 108 are head guard attaching members provided to erect at the rear part of each of the side members 107.

In the forklift truck composed like this, vertical force F1 due to the vertical shock which occurs when the forklift truck is traveling acts on the axle support member 13 of the cross member 1 connecting the left and right side members 107 as shown in FIG. 3 and FIG. 5.

Further, moment Mc is generated by the weight Wc of the counterweight 101 supported on the body frame 106 at the bearing parts 100b of the side members 107 because of the offset of the center of gravity of the counter weight from said bearing parts 10b, and horizontal force F2 acts on the axle support member 13 as shown in FIG. 5.

Therefore, complex bending stress occurs at the welded portion of the lateral end of the cross member to the inside face of the side member due to vertical force F1 and lateral force F2. Bending moment due to vertical force F1 is borne mainly by the vertical plate 12 which has a large section modulus concerning a horizontal plane because the modulus is proportional to the second power of the height of the vertical plane and bending moment due to horizontal force F2 is borne mainly by the horizontal plate 11 which has a large section modulus concerning a vertical plane in lateral direction because the modulus is proportional to the second power of the width of the horizontal plate in the longitudinal direction of the side frames. Accordingly, the stress at said welded portion, which is inversely proportional to section modulus, is reduced compared with the case the cross member is composed of two vertical plate which has a large section modulus only concerning a horizontal plane and a small section modulus concerning a vertical plane in lateral direction because it is the sum of the section modulus of each vertical plate concerning a vertical plane in lateral direction, which is proportional to the second power of the thickness of the plate, and the plate thickness is small compared with the plate height. Therefore, according to the present invention, the stress due to the bending moments can be reduced.

Further, with the embodiment like this, in addition to that the bending stresses at the weld connections of the cross member 1 formed in a crooked shape having the general shape of an inversed letter "L" to the side members 107 are reduced, the exhaust muffler 2 can be located in the muffler space formed at the rear of the vertical plate 12 and under the horizontal plate 11 of the crooked member 10, the length of the forklift truck can be reduced compared with that of prior art in which the exhaust muffler is located at the rear of the rear side vertical plate of two parallel vertical plates.

Further, with the embodiment like this, the horizontal plate 11 of the cross member 1 extends rearward near to the counter weight 10 so that it partitions the radiator 102 side space above the horizontal plate 11 from said muffler space 13, so the horizontal plate 11 prevents air including the radiator cooling air from flowing from the area behind the radiator 102 before the exhaust opening 103 of the counter weight 101 to the area 110 under the truck body.

Therefore, the horizontal plate 11 serves to prevent cooling air from flowing from the area behind the radiator 102 before the exhaust opening 103 through to the area under the truck body in addition as a strength member, as a result winding-up of dust on the ground by the cooling air is prevented.

As has been described in the foregoing, according to the present invention, the frame body having no dead space in the cross member while securing the constructional strength of the cross member is composed, an increase in length of the truck body due to the space needed in the prior art to locate the exhaust muffler can be evaded, thus a compact forklift truck can be provided. Further, a forklift truck with which winding-up of dust on the ground caused when the radiator cooling air flows to the underside of the truck body is prevented without providing additional parts in particular which induces an increase in cost.

According to the present invention, by composing the cross member such that it has a cross section of the general shape of an inversed letter "L" with an axle support member fixed to the lower end thereof, the strength of the welded portions of the lateral ends to the side frames against bending in both vertical and horizontal direction is secured while reducing the longitudinal length of the truck body.

Still further, according to the present invention, by locating the exhaust muffler in the space formed behind the vertical plate under the horizontal plate of the cross member formed into a crooked member having the general shape of an inversed letter "L", the cross member serves also as a member for accommodating the muffler, and the length of the truck body can be reduced compared with that of the prior art, resulting in a compact forklift truck.

What is claimed is:

1. A body structure of a forklift truck having a pair of left and right side frames extending in a longitudinal direction of the vehicle body, and a cross member fixed to the inside faces of the side frames at the lateral side ends of the cross member to connect the side frames, the cross member being located on an axle, wherein said cross member is composed of a vertical plate and a horizontal plate fixed to the vertical plate at a substantially right angle to form a crooked member having the general shape of an inversed letter "L" with an axle support member fixed to the lower end of the vertical plate.

2. The body structure of a forklift truck according to claim 1, wherein said cross member is a welded construction of the crooked member and the axle support member, the lateral side ends of the crooked member is welded to the inside faces of the side frames, and the axle support member is welded substantially horizontally to the lower end of the crooked member.

3. A body structure of a forklift truck in which a counter weight having an opening for exhausting a cooling air flowing out from a radiator is located at the rear side of the radiator, the body of the forklift truck having a pair of left and right side frames extending in a longitudinal direction of the body with a counter weight attached at the rear of the body, a cross member being fixed to the inside faces of the side frames at the lateral side ends of the cross member to connect the side frames, the cross member being located on a rear axle, wherein said cross member is composed of a vertical plate and a horizontal plate fixed to the vertical plate at a substantially right angle to form a crooked member having the general shape of an inversed letter "L" with an axle support member fixed the lower end of the vertical plate, and an engine exhaust muffler is located in the space formed at the rear of the vertical plate under the horizontal plate.

4. The body structure of a forklift truck according to claim 3, wherein the horizontal plate is located under said radiator to prevent air including the cooling air flowing out from the radiator toward the opening of the counter weight from flowing to the underside of the vehicle body.

* * * * *